United States Patent [19]

Nymann

[11] 4,029,159
[45] June 14, 1977

[54] BRAKE CONTROL FOR ROTARY ELECTRIC TOOLS

[76] Inventor: Svend Nymann, 68 E. Hartsdale Ave., Hartsdale, N.Y. 10530

[22] Filed: Sept. 22, 1975

[21] Appl. No.: 615,358

Related U.S. Application Data

[63] Continuation-in-part of Ser. No. 476,474, June 5, 1974, abandoned.

[52] U.S. Cl. .................................... 173/163; 192/2
[51] Int. Cl.² ................................................ E21B 3/00
[58] Field of Search ............... 192/1, 2; 310/50, 77; 173/163; 188/177

[56] References Cited

UNITED STATES PATENTS

| | | | |
|---|---|---|---|
| 1,591,692 | 7/1926 | Alter et al. | 188/171 |
| 1,639,038 | 8/1927 | Jobst | 310/77 X |
| 1,942,825 | 1/1934 | Meunier | 188/171 X |
| 2,009,120 | 7/1935 | Price | 188/171 |
| 2,233,798 | 3/1941 | Robins | 192/2 |
| 2,681,717 | 6/1954 | Spurgeon | 192/2 |
| 2,823,325 | 2/1958 | Stephan | 188/171 X |
| 2,898,956 | 8/1959 | Zern | 310/50 X |
| 3,028,934 | 4/1962 | Lister | 188/171 |
| 3,379,907 | 4/1968 | Hollinger | 310/77 |
| 3,596,739 | 8/1971 | Ramsey et al. | 188/171 |

Primary Examiner—Ernest R. Purser
Assistant Examiner—Richard E. Favreau
Attorney, Agent, or Firm—Martin J. Spellman, Jr.

[57] ABSTRACT

A brake control for rotary electric tools, particularly hand tools, comprises a pair of spring biased brake shoes positioned about the periphery of the armature of an electric motor which drives the electric tool. The brake shoes are normally spring biased into engagement with a brake drum coupled to the armature, but upon actuation of the motor a cam element moves the brake shoes back from the drum permitting the motor to operate the tool. The cam element is actuated by a solenoid preferably located in the handle of the tool and operated by the trigger mechanism. When pressure is released on the trigger, the solenoid actuates the cam through a suitable linkage causing the brake shoes to engage the brake drum on the armature thereby immediately stopping the tool and eliminating possible safety problems.

6 Claims, 4 Drawing Figures

BRAKE CONTROL FOR ROTARY ELECTRIC TOOLS

CROSS REFERENCES TO RELATED APPLICATIONS

This application is a continuation-in-part of pending U.S. patent application Ser. No. 476,474 which was filed on June 5, 1974, now abandoned.

BACKGROUND OF THE INVENTION

The invention relates to hand operated electric tools and particularly to a brake control for said tools.

The prior art includes a number of patents which in general disclose armature brakes for electric motors although a number of them are disc type breaks. Among the more pertinent references are U.S. Pat. No. 3,579,066 to Bearfield et al and U.S. Pat. No. 3,339,681 to Holladay. The Bearfield patent discloses an electric motor having a solenoid mechanism connected to a brake shoe which upon deactivation of the solenoid automatically engages a brake drum or the rotor of the electric motor due to the action of a spring thereby stopping the rotation of the motor. The Holladay patent essentially shows a solenoid actuated brake mechanism for an electric motor.

Also of interest is U.S. Pat. No. 515,755 to Dunn which in general discloses an electric motor in which a brake shoe is spring biased into engagement with a brake drum and released by the action of a solenoid.

Other prior art patents in this general area include U.S. Pat. Nos. 3,096,453, 3,176,173 and 3,335,304. These patents are representative of the existing art in the general area of the present invention and are not intended to be an all inclusive listing of the prior art.

The present invention is an improvement over the prior art noted above in that the brake device may be readily incorporated in a wide variety of rotary tools and is particularly suited for pistol shaped electric tools with the solenoid being positioned within the handle or grip of said tool and the brake itself being positioned in the barrel of the tool. The cam operation of spring biased brake shoes against the brake drum provides a safe immediate halt to the operation of the tool when pressure is released on the trigger. In electric drills, for example, the power may be cut immediately when the drill breaks through the material thereby preventing the possibility of the drill getting away from the operator. This is also essential when operating tools such as electric saws where physical injury may result from the continuous rotation of the blade.

SUMMARY OF THE INVENTION

The present invention relates to an improved brake control device particularly for rotary electric tools. In one embodiment, the invention comprises a pair of spaced brake shoes which are mounted about the armature of an electric motor in the barrel of an electric hand tool. The brake shoes are normally biased by leaf springs into engagement with a brake drum on the armature to maintain the motor in an off position. A solenoid is mounted within the handle of the tool and coupled by a linkage to a cam which actuates the brake shoes driving them away from the armature and associated brake drum while power is simultaneously applied to the motor. When pressure is released on the trigger the solenoid actuates the cam element to bring the shoes into engagement with the brake drum thereby immediately halting the tool. While the invention is particularly suited for use in hand tools, it is also adaptable for use in larger tools and machinery.

Accordingly, an object of this invention is to provide a new and improved brake control device for rotary tools.

Another object of this invention is to provide a new and improved brake control device for hand operated electric tools.

A further object of this invention is to provide an armature brake for pistol shaped electric tools wherein a pair of brake shoes are immediately cammed into position with a brake drum mounted about an armature when pressure is released on the trigger.

A more specific object of this invention is to provide a new and improved brake control wherein a solenoid is mounted in the handle of a pistol shaped electric tool and is coupled to a cam driven brake arrangement in the barrel thereof wherein a pair of brake shoes are cammed into engagement with a brake drum of the armature upon release of pressure on the trigger in order to immediately halt the tool.

BRIEF DESCRIPTION OF THE DRAWINGS

Other objects and advantages may be seen from the following description when viewed in conjunction with the accompanying drawings wherein.

DETAILED DESCRIPTION OF THE INVENTION

Figure 1:
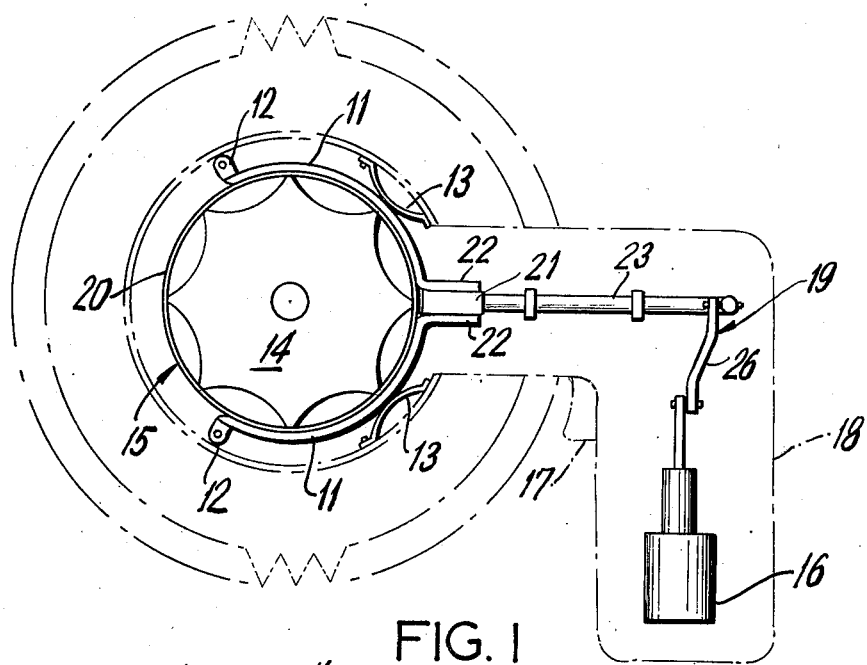
FIG. 1 is a simplified schematic drawing of the invention showing the mounting of the armature brake in an "off" condition within a hand operated electric tool, and, FIG. 2 is a schematic illustration of the invention with the brake actuated to maintain the tool in an "on" condition.
Figure 2:
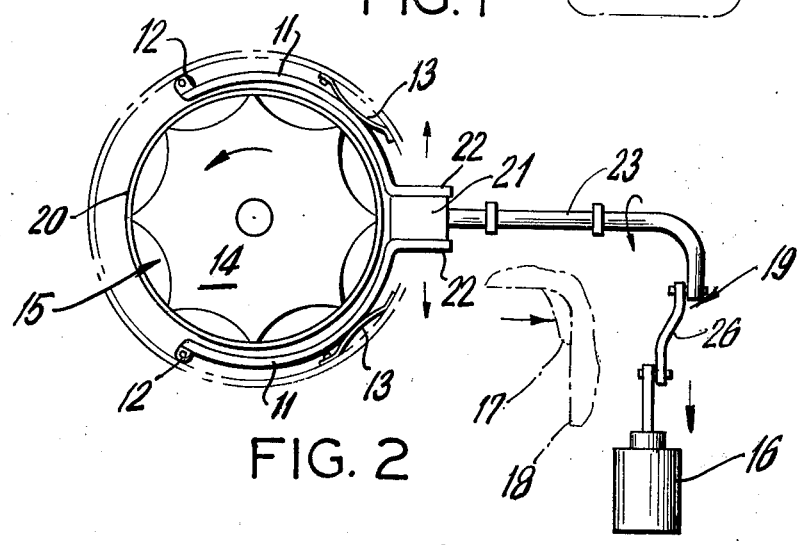

Referring now to FIG. 1 and 2 of the drawings, the brake control device of the present invention comprises means for immediately halting a rotary tool 10 when power is cut off to the tool 10. The device includes a pair of brake shoes 11 which are mounted to supporting means 12 and are normally biased by leaf springs 13 into engagement with the brake drum 20 on the armature 14, see FIG. 1. The motor 15 and the solenoid 16 are simultaneously operated by actuation of the trigger 17 through a conventional electric circuit (not shown). Consequently, during normal operation, as shown in FIG. 2, the solenoid 16 would release the brake at the same time that the motor 15 is operated thereby permitting the tool to operate.

The solenoid 16 is mounted within the handle 18 of the tool 10 and is precisely shaped to fit conveniently therein. The solenoid 16 is operated by the trigger 17 and in turn is coupled by the linkage 19 to cam element 21. The cam element 21 is mounted between the projecting guide surfaces 22 of the curved brake shoes so that in operation, the cam element engages the surfaces 22 spreading the shoes 11 apart. The cam 21 is substantially rectangular in configuration with the long dimension approximately in line with the forward portion of the linkage element 23 in a non-operated condition. When the tool is operated the linkage 19 rotates the cam element 21 transversely to the guides 22 forcing the shoes 11 apart. The linkage element 12 has a curved portion which is connected to an intermediate element 26 and eventually coupled to the solenoid 10.

Pressing the trigger 17 as in FIG. 2 causes the solenoid 16 to move the linkage 19 including element 26 downwardly and thereby cam the brake shoes 11 apart. The motor 15 would then operate as long as the trigger 17 is pressed. Upon release of the trigger 17, the brake shoes 11 would immediately engage the drum 20 on the armature 14 under urging of the leaf springs 13. As a result, the motor 15 is immediately brought to a halt to prevent the continuous running of the tool and eliminate a possibly safety hazard, particularly with tools such as saws or drills.

Figures 3, 4:
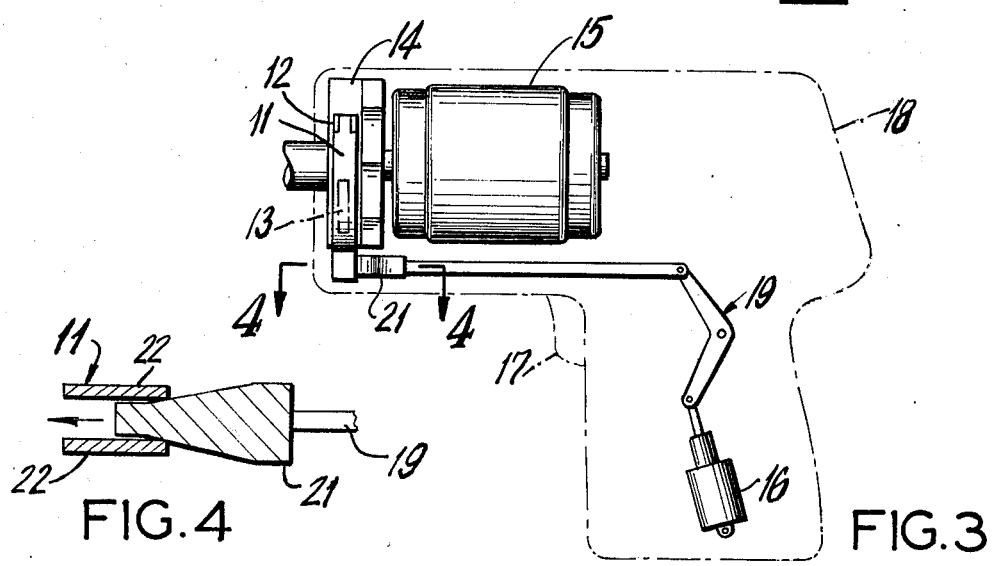
FIG. 3 is a schematic illustration of the brake in a drill-type device, and, FIG. 4 is a cross-sectional view taken along the lines 4—4 of FIG. 3.

FIGS. 3 and 4 show an embodiment of the invention used in rotary drills. The armature 14 is mounted perpendicular to the linkage 19 and in line with the motor 15. The cam 21 has a peculiar sloped configuration with the surfaces thereof designed to spread the projecting portions 22 apart as the cam 21 moves back and forth under urging of the solenoid 16 or it may be rectangular as shown in FIGS. 1 and 2. This embodiment is an important safety feature in drills since the drill in conventional tools continues to run and the bit may break or chip when the crill breaks through material. Here the cam 21 releases the brake shoes 11 to immediately halt the drill when pressure is removed from the trigger 17.

The electrical circuits are not shown in detail since they are conventional, but in essence, the solenoid 16 is electrically connected in parallel with the motor 15 so that turning on the motor automatically releases the brake while interrupting the motor causes the springs 13 to set the brake automatically. The invention applies to any number of hand tools such as saws, drills, etc., any may be advantageously incorporated into any pistol shaped tool due to the arrangement of the solenoid 16 and the motor in a configuration designed to fit into the overall handle and barrel configuration of a tool.

While the invention has been explained by a detailed description of certain specific embodiments, it is understood that various modifications and substitutions can be made in any of them within the scope of the appended claims which are intended also to include equivalents of such embodiments.

What is claimed is:

1. In a rotary tool having a motor with a rotating armature and a brake drum mounted thereabout, a brake control device comprising:
    a pair of curved brake shoes pivotably mounted at one end about the brake drum and each brake shoe having a projecting portion extending outwardly from the armature and in a substantially parallel spaced relation,
    spring means normally biasing the brake shoes into engagement with the brake drum, said means comprising a separate leaf spring engaging each brake spring,
    a cam element mounted between the projecting portions of the break shoes,
    a solenoid fixedly mounted within the tool,
    a linkage connected at one end to the solenoid and connected at the other end to an end portion of the cam element, and
    means for activating the solenoid and the motor wherein the solenoid actuates the cam element to cam the projecting portions of the brake shoes outwardly against the bias of the spring means thereby releasing the brake drum and associated armature and wherein the armature is immediately halted when the solenoid is deactivated by camming the brake shoes into engagment with the brake drum under urging of the spring means.

2. In a rotary tool in accordance with claim 1 wherein:
    the cam element is substantially rectangular in configuration and is mounted at one end to the linkage and rotates about a central axis entending parallel to the longer sides thereof under urging of the solenoid connected linkage.

3. In a rotary tool in accordance with claim 1 wherein:
    the armature is rotatable about an axis which is substantially perpendicular to the central axis of the cam element, and, wherein,
    the tool comprises a pistol-shaped tool having a handle and barrel with the solenoid mounted in the handle and the armature mounted in the barrel.

4. In a rotary tool in accordance with claim 1 wherein:
    the linkage comprises a first member mounted at one end to the cam element, said first member having a main portion substantially parallel to the axis of the cam element and a curved rear portion, a second curved member pinned to rear portion of the first member and wherein said second member is coupled at its other end to the solenoid.

5. In a rotary tool in accordance with claim 1 in combination wherein:
    the cam element comprises an elongated shaped element having walls sloping outwardly towards the rear and wherein said element is connected at one end to the linkage to be moved to and fro driving the projecting portions of the brake shoes in predetermined directions.

6. In a rotary tool in accordance with claim 5 wherein:
    the rotating armature is mounted with its axis substantially parallel to the direction of cam movement and wherein,
    the tool comprises a pistol-shaped tool with the solenoid mounted in the handle and the armature in the barrel of said tool.

* * * * *